United States Patent
Pletka et al.

(10) Patent No.: US 11,157,379 B2
(45) Date of Patent: Oct. 26, 2021

(54) MANAGING BLOCKS OF MEMORY BASED ON BLOCK HEALTH USING HYBRID CONTROLLERS

(71) Applicant: International Business Machines Corporation, Armonk, NY (US)

(72) Inventors: Roman Alexander Pletka, Uster (CH); Aaron Daniel Fry, Richmond, TX (US); Sasa Tomic, Kilchberg (CH); Nikolaos Papandreou, Thalwil (CH); Nikolas Ioannou, Zurich (CH); Radu Ioan Stoica, Zurich (CH); Timothy Fisher, Cypress, TX (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 16/669,209

(22) Filed: Oct. 30, 2019

(65) Prior Publication Data
US 2021/0133070 A1   May 6, 2021

(51) Int. Cl.
G06F 3/06    (2006.01)
G06F 11/30   (2006.01)
G06F 12/02   (2006.01)

(52) U.S. Cl.
CPC .......... *G06F 11/3037* (2013.01); *G06F 3/064* (2013.01); *G06F 3/0614* (2013.01);
(Continued)

(58) Field of Classification Search
CPC ...... G06F 3/0614; G06F 3/0679; G06F 3/064; G06F 3/0659; G06F 2212/7211; G06F 12/0246; G06F 11/3037; G06F 11/3058
See application file for complete search history.

(56) References Cited

U.S. PATENT DOCUMENTS 9,465,732 B2   10/2016  Manohar et al.
9,558,107 B2    1/2017  Camp et al.
(Continued)

FOREIGN PATENT DOCUMENTS

WO    2019076613    4/2019

OTHER PUBLICATIONS

F. Margaglia and A. Brinkmann, "Improving MLC flash performance and endurance with extended P/E cycles," 2015 31st Symposium on Mass Storage Systems and Technologies (MSST), Santa Clara, CA, USA, 2015, pp. 1-12, doi: 10.1109/MSST.2015.7208278. (Year: 2015).*

(Continued)

*Primary Examiner* — Khoa D Doan
(74) *Attorney, Agent, or Firm* — Zilka-Kotab, P.C.

(57) ABSTRACT

A computer-implemented method, according to one embodiment, is for wear leveling blocks of memory. The computer-implemented method includes: determining the health of blocks of memory which are configured in multi-bit-per-cell mode. The blocks configured in multi-bit-per-cell mode are in a second pool, while blocks that are configured in single-level cell (SLC) mode are in a first pool. Moreover, the computer-implemented method is performed in some approaches with a proviso that the health of a block of memory is not determined while the block is configured in SLC mode. Moreover, health values are assigned to the blocks of memory in the second pool based on the health of the respective block. Each of the health values is further correlated with a respective data temperature.

19 Claims, 12 Drawing Sheets

(52) U.S. Cl.
CPC .......... *G06F 3/0659* (2013.01); *G06F 3/0679* (2013.01); *G06F 11/3058* (2013.01); *G06F 12/0246* (2013.01); *G06F 2212/7211* (2013.01)

(56) References Cited

U.S. PATENT DOCUMENTS

| | | | |
|---|---|---|---|
| 10,209,914 B2* | 2/2019 | Agarwal | G11C 16/0483 |
| 10,223,029 B2 | 3/2019 | Gorobets et al. | |
| 2010/0017555 A1* | 1/2010 | Chang | G06F 12/0246 |
| | | | 711/103 |
| 2011/0252289 A1* | 10/2011 | Patapoutian | H03M 13/29 |
| | | | 714/763 |
| 2013/0080730 A1* | 3/2013 | Kim | G06F 3/0679 |
| | | | 711/203 |
| 2014/0281121 A1* | 9/2014 | Karamcheti | G06F 9/4881 |
| | | | 711/102 |
| 2018/0211708 A1* | 7/2018 | Igahara | G06F 3/0679 |
| 2018/0217751 A1* | 8/2018 | Agarwal | G11C 16/3422 |
| 2019/0171372 A1 | 6/2019 | Szubbocsev | |

OTHER PUBLICATIONS

J. Kim, D. Jung, J. Kim and J. Huh, "A methodology for extracting performance parameters in solid state disks (SSDs)," 2009 IEEE International Symposium on Modeling, Analysis & Simulation of Computer and Telecommunication Systems, 2009, pp. 1-10, doi: 10.1109/MASCOT.2009.5366154. (Year: 2009).*
Pletka et al., "Designing Enterprise Controllers with QLC 3D NAND," Flash Memory Summit, 2018, pp. 1-13.
Jimenez et al., "Wear Unleveling: Improving NAND Flash Lifetime by Balancing Page Endurance," Proceedings of the 12th USENIX Conference on File and Storage Technologies (FAST '14), Feb. 17-20, 2014, pp. 47-59.
Pletka et al., U.S. Appl. No. 16/459,408, filed Jul. 1, 2019.
Pletka et al., U.S. Appl. No. 16/459,393, filed Jul. 1, 2019.
U.S. Appl. No. 16/014,938, filed Jun. 21, 2018.

* cited by examiner

MANAGING BLOCKS OF MEMORY BASED ON BLOCK HEALTH USING HYBRID CONTROLLERS

BACKGROUND

The present invention relates to data storage systems, and more particularly, this invention relates to using block health to manage blocks of memory that are configured in different modes.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is anywhere from 256, to 512, or even several thousands of pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH, LDPC, or other codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The physical configurations of memory blocks in non-volatile memory have also changed over time. For instance, in the past Flash blocks had a single-bit-per-cell configuration, but improvements in data storage have introduced Flash blocks that implement multi-bit-per-cell configurations. Some Flash blocks also support more than one different physical configuration, e.g., based on their given mode. Moreover, hybrid controllers are capable of managing and/or adapting these blocks which are configured in single-bit-per-cell mode as well as multi-bit-per-cell mode.

SUMMARY

A computer-implemented method, according to one embodiment, is for wear leveling blocks of memory. The computer-implemented method includes: determining the health of blocks of memory which are configured in multi-bit-per-cell mode. The blocks configured in multi-bit-per-cell mode are in a second pool, while blocks that are configured in single-level cell (SLC) mode are in a first pool. Moreover, the computer-implemented method is performed in some approaches with a proviso that the health of a block of memory is not determined while the block is configured in SLC mode. Moreover, health values are assigned to the blocks of memory in the second pool based on the health of the respective block. Each of the health values is further correlated with a respective data temperature.

A computer program product, according to another embodiment, is for wear leveling blocks of memory. The computer program product includes a computer readable storage medium having program instructions embodied therewith. Moreover, the program instructions are readable and/or executable by a processor to cause the processor to: perform the foregoing method.

A system, according to yet another embodiment, includes: a plurality of non-volatile random access memory (NVRAM) blocks configured to store data, a processor, and logic integrated with and/or executable by the processor. The logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
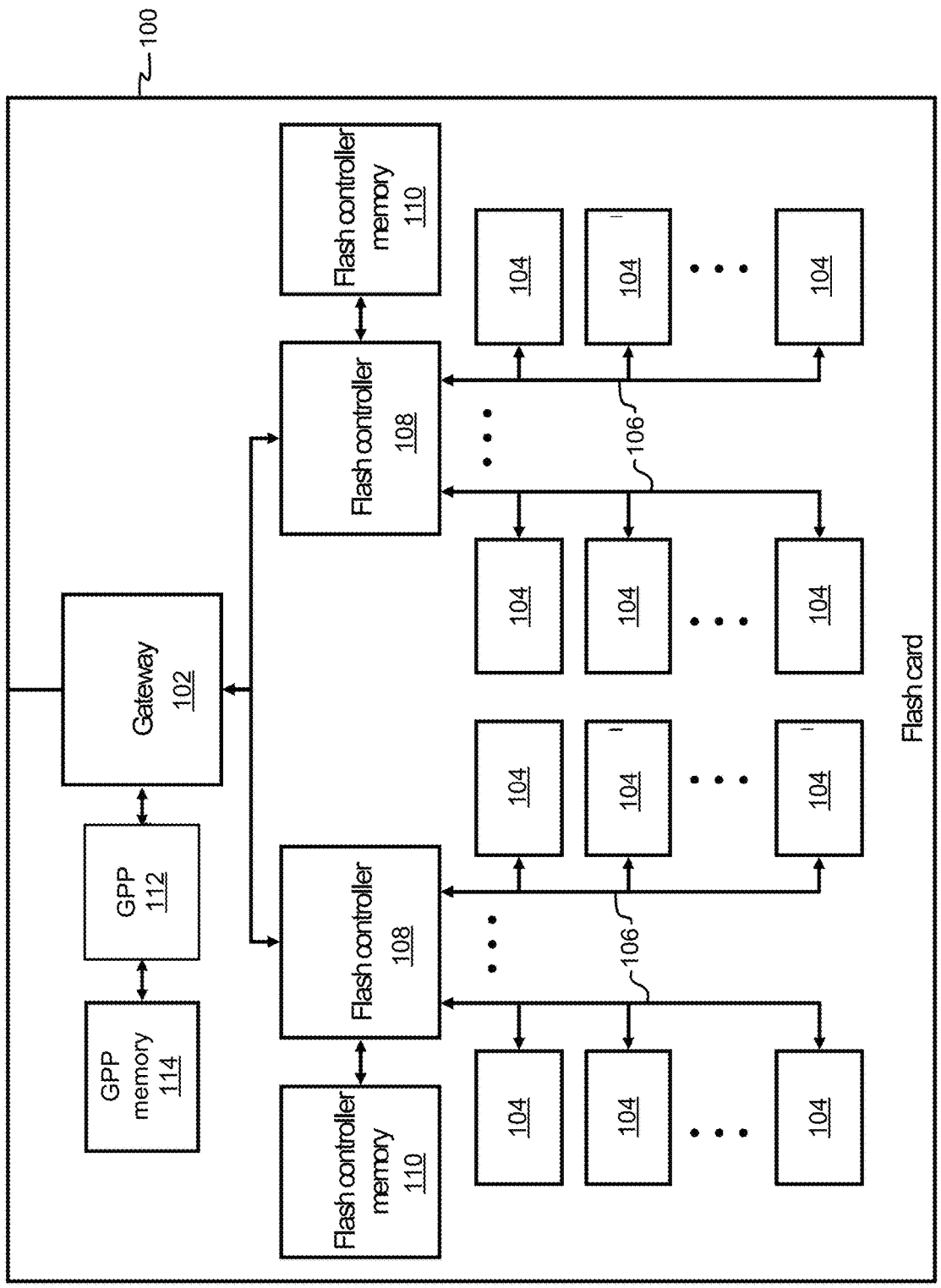
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method is for wear leveling blocks of memory. The computer-implemented method includes: determining the health of blocks of memory which are configured in multi-bit-per-cell mode. The blocks configured in multi-bit-per-cell mode are in a second pool, while blocks that are configured in single-level cell (SLC) mode are in a first pool. Moreover, the computer-implemented method is performed in some approaches with a proviso that the health of a block of memory is not determined while the block is configured in SLC mode. Moreover, health values are assigned to the blocks of memory in the second pool based on the health of the respective block. Each of the health values is further correlated with a respective data temperature.

In another general embodiment, a computer program product is for wear leveling blocks of memory. The computer program product includes a computer readable storage medium having program instructions embodied therewith. Moreover, the program instructions are readable and/or executable by a processor to cause the processor to: perform the foregoing method.

In yet another general embodiment, a system includes: a plurality of non-volatile random access memory (NVRAM) blocks configured to store data, a processor, and logic integrated with and/or executable by the processor. The logic is configured to: perform the foregoing method.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
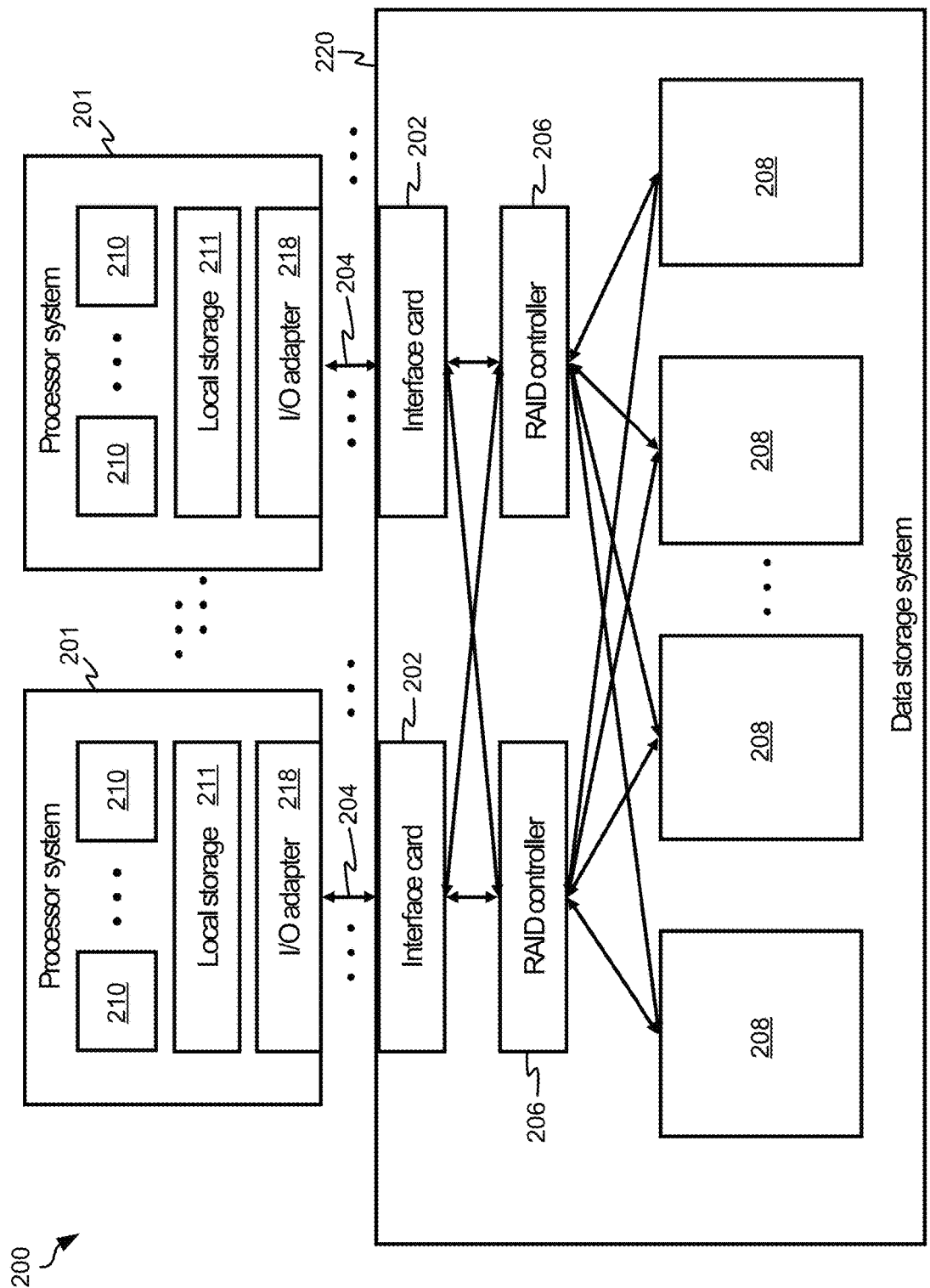
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 914 of FIG. 9, ROM 916 of FIG. 9, etc.), and an I/O adapter 218 configured to communicate with the data storage system 220.

Referring again to FIG. 1, memory controllers 108, GPP 112, and/or other controllers described herein (e.g., RAID controllers 206 of FIG. 2) may be able to perform various functions on stored data, depending on the desired embodiment. Specifically, memory controllers or GPP 112 may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logical erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection. In embodiments that do not add RAID-like parity, an LEB may consist of a single physical block.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 of FIG. 1) and/or GPP 112 may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing write heat separation.

Write Heat Separation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for write heat separation when determining the write heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, write heat separation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of write heat separation is two-fold. First, performing a garbage collection process on a hot memory block will prevent triggering the relocation of cold data as well. In the absence of write heat separation, updates to hot data, which are performed frequently, also results in the undesirable relocations of all cold data collocated on the same LEB as the hot data being relocated. Therefore, the write amplification incurred by performing garbage collection is much lower for embodiments implementing write heat separation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing write heat separation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened by associating one or more erased blocks to the LEB.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Figure 3:
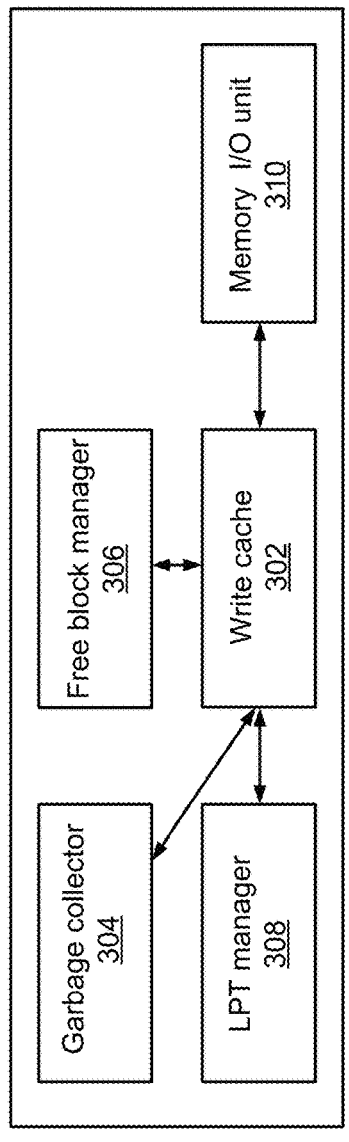
FIG. 3 is a system diagram, in accordance with one embodiment.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4KiB or 16KiB logical addresses. The memory I/O unit 310 communicates with the memory chips in order to perform low level operations, e.g., such as reading one or more non-volatile memory pages, writing a non-volatile memory page, erasing a non-volatile memory block, etc.

Figure 4:
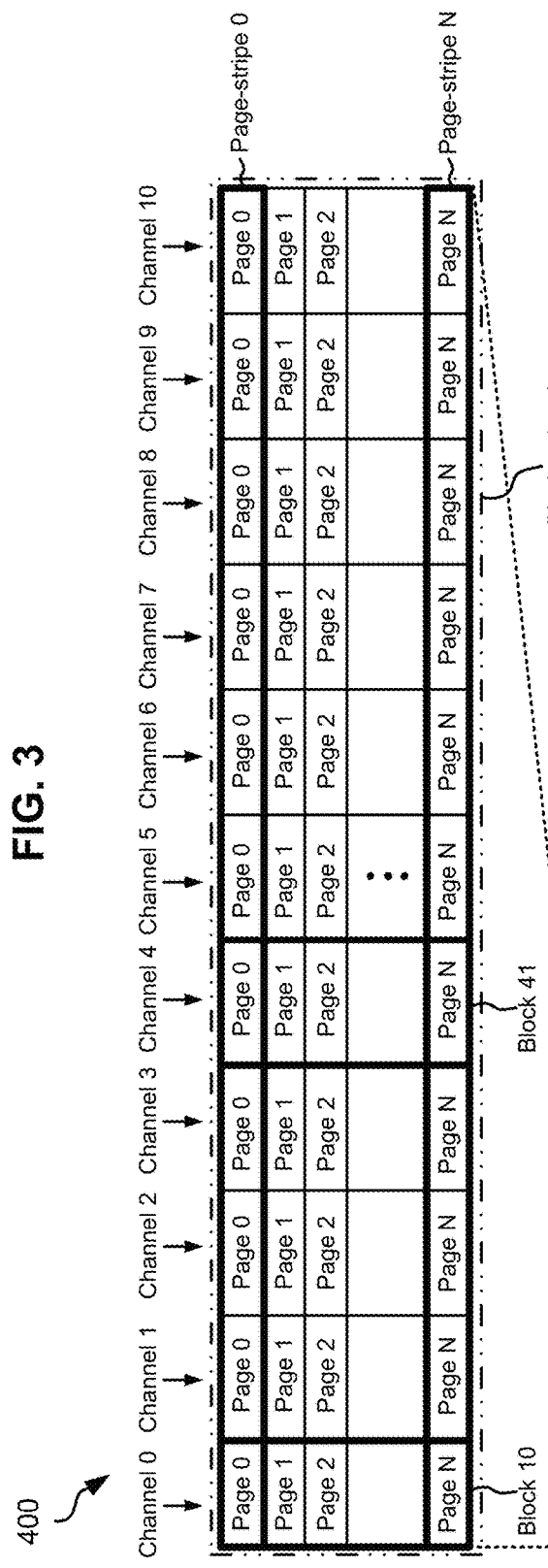
FIG. 4 is a conceptual diagram which includes a block-stripe and page-stripe, in accordance with one embodiment.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or less in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As alluded to above, physical configurations of memory blocks in non-volatile memory have changed over time. For instance, in the past Flash blocks had a single-bit-per-cell configuration, but improvements in data storage have introduced Flash blocks that implement multi-bit-per-cell configurations. While blocks having multi-bit-per-cell configurations are able to store more information than blocks having a single-bit-per-cell configuration, this increase in storage capacity comes at a price in terms of performance latency. For example, memory blocks having a single-bit-per-cell configuration experience write latencies that are up to about 10 times lower than experienced by memory blocks having multi-bit-per-cell configurations. Similarly, memory blocks having a single-bit-per-cell configuration experience lower read latencies than memory blocks having multi-bit-per-cell configurations.

This tradeoff between storage capacity versus performance and endurance allows for storage systems to tailor the performance capabilities of memory to some extent. For instance, a storage system predicted to have a high amount of I/O traffic is able to reconfigure a greater number of memory blocks having a single-bit-per-cell configuration than those having multi-bit-per-cell configurations. Conversely, a storage system predicted to store a large amount of cold data is able to reconfigure a greater number of memory blocks having multi-bit-per-cell configurations than those having a single-bit-per-cell configuration. It follows that the blocks of memory experience different program/erase (P/E) cycle rates depending on the type (e.g., temperature measured as the write heat) of data that is stored therein. As a result, blocks of memory wear at different rates, thereby leading to a block health distribution that varies over time not only among blocks configured in the same mode, but also among blocks that are configured in different modes.

Conventionally, block health was able to be determined at any point in time for programmed blocks. However, as the physical configurations of memory blocks in non-volatile memory have changed over time, this is no longer the case. For example, block health can only be measured accurately shortly after a full block is programmed in three dimensional (3D) NAND Flash. Accordingly, the amount of time that elapses between the first and last page being programmed has a significant impact on measuring block health, which is often estimated because of a lack of accurate measurement information. As a consequence, the amount of metadata that is stored for each block of memory in conventional systems has increased dramatically, thereby sacrificing storage capacity and contributing to performance issues.

In sharp contrast to the aforementioned shortcomings experienced by conventional systems, various ones of the embodiments included herein implement hybrid controllers which are able to reduce metadata overhead and simplify the process of accurately wear leveling blocks of memory by implementing desirable health binning procedures. With respect to the present description, "health binning" involves using healthier blocks to store data that has a hotter temperature, and using less healthy blocks to store data that has a colder temperature (at least with respect to the hot data), e.g., as will be described in further detail below.

Figure 5:
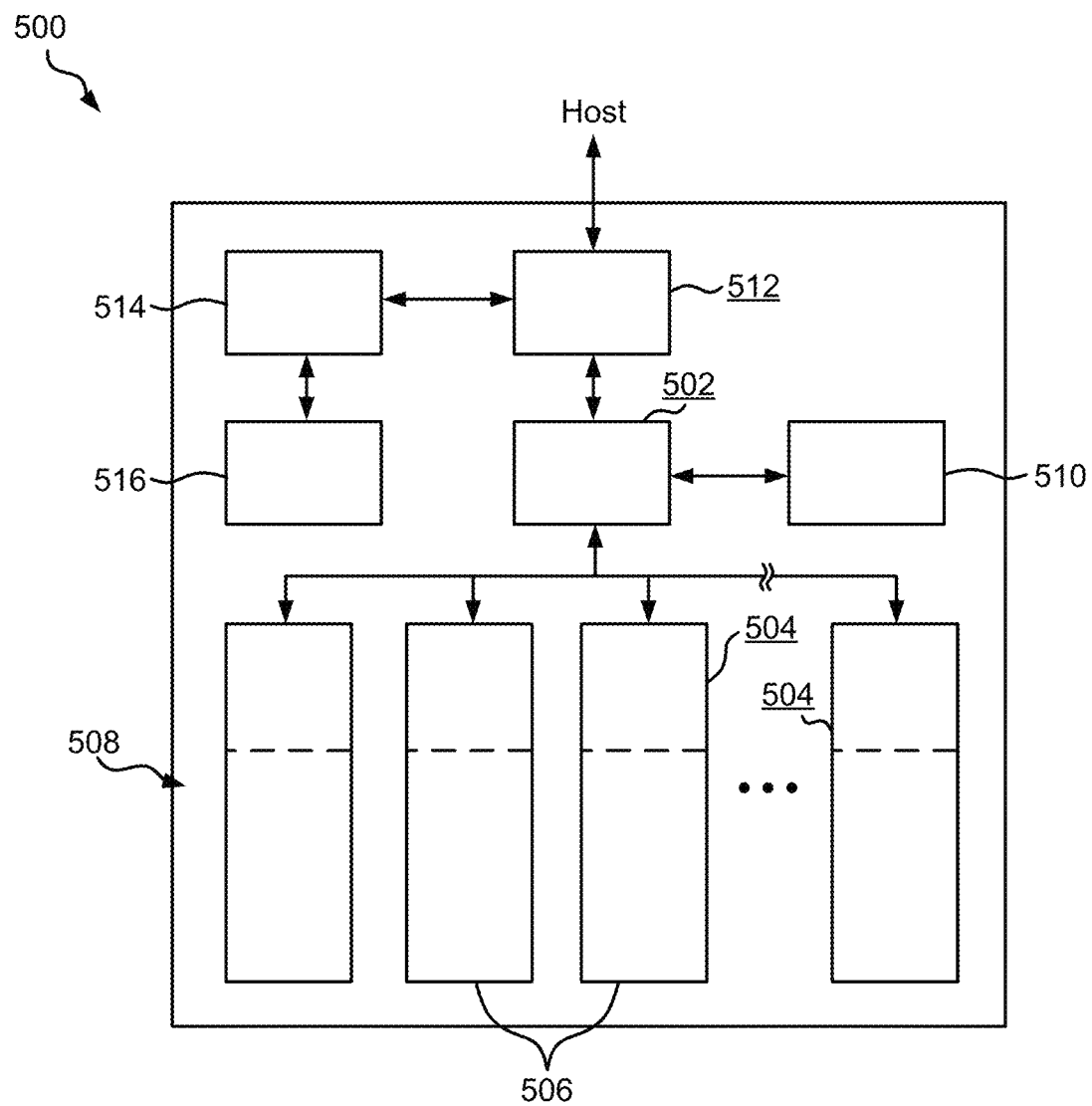
FIG. 5 is a representational view of a non-volatile memory module, in accordance with one embodiment.

Looking now to FIG. 5, a non-volatile memory module 500 having a hybrid controller 502 is illustrated in accordance with one embodiment. As an option, the present memory module 500 may be implemented in conjunction with features from any other embodiment listed herein, such as those described with reference to the other FIGS. However, such memory module 500 and others presented herein may be used in various applications and/or in permutations which may or may not be specifically described in the illustrative embodiments listed herein. Further, the memory module 500 presented herein may be used in any desired environment. Thus FIG. 5 (and the other FIGS.) may be deemed to include any possible permutation.

As noted above, the memory module 500 includes a hybrid controller 502 which is capable of managing and/or adapting blocks which are configured in single-bit-per-cell mode (also referred to herein as "single-level cell mode", or "SLC mode") as well as multi-bit-per-cell mode. According to some approaches, the hybrid controller 502 manages the different block configurations by logically splitting them into two different pools 504, 506. One of these pools 504 is designated as including those blocks which are configured in SLC mode, while the other pool 506 includes the blocks configured in multi-bit-per-cell mode. In some approaches, the blocks configured in multi-bit-per-cell mode are configured in triple-level cell (TLC) mode. In other approaches, the blocks configured in multi-bit-per-cell mode are configured in quad-level cell (QLC) mode. In further approaches, the blocks configured in multi-bit-per-cell mode are configured in penta-level cell (PLC) mode.

Each of the pools 504, 506 extend across a number of data storage components (e.g., NVRAM memory modules such as NAND Flash memory devices) which together serve as a memory array 508. It follows that the various components illustrated in FIG. 5 function as a memory card and may implement any of the approaches described above with respect to memory card 100 of FIG. 1.

Referring still to FIG. 5, the hybrid controller 502 is also coupled to a cache memory 510 as well as a gateway 512 which receives data commands from one or more hosts, storage systems, running applications, etc. The gateway 512 is in turn coupled to a GPP 514 and GPP memory 516. As mentioned above, the GPP 514 may be of any desired type, e.g., such as an ASIC, FPGA, CPU, etc. Similarly, the GPP memory 516 may be of any desired type, e.g., such as RAM, ROM, battery-backed DRAM, phase-change memory PC-RAM, MRAM, STT-MRAM, etc., and/or combinations thereof.

The hybrid controller 502 may store data that is frequently accessed (e.g., read, rewritten, appended to, etc.) in blocks that are configured in SLC mode and therefore included in the first pool 504, while data that is accessed less frequently is stored in blocks that are configured in multi-bit-per-cell mode and therefore included in the second pool 506. This storage scheme achieves an efficient use of the different blocks of memory and their respective performance characteristics. However, as memory blocks in each of the pools 504, 506 experience different amounts of wear as well as different numbers of P/E cycles over time, the effective health of each block diverges from the others. Even though wear of different blocks increases differently with increasing P/E cycles, for the same P/E cycles, the wear experienced in multi-bit-cells increases faster than that experienced in SLC cells on average. Moreover, as the ratio of hot and cold data stored in the memory module 500 fluctuates over time, each of the respective pools 504, 506 may be underutilized and/or overutilized.

Accordingly, the hybrid controller 502 is preferably able to perform health binning in order to manage the health of the various blocks in memory. As mentioned above, "health binning" involves using healthier blocks to store data that has a hotter temperature, and using less healthy blocks to store data that has a colder temperature (at least with respect to the hot data). Hotter data corresponds to a higher number of P/E cycles being performed compared to colder data. Storing hotter data in healthier blocks while storing colder data in less healthy blocks thereby causes the health of each respective block in memory to converge towards a moving average and maintain efficient performance. Health binning includes maintaining and updating block health statistics periodically and is preferably executed in the background of any nominal data storage operations.

Figure 6A:
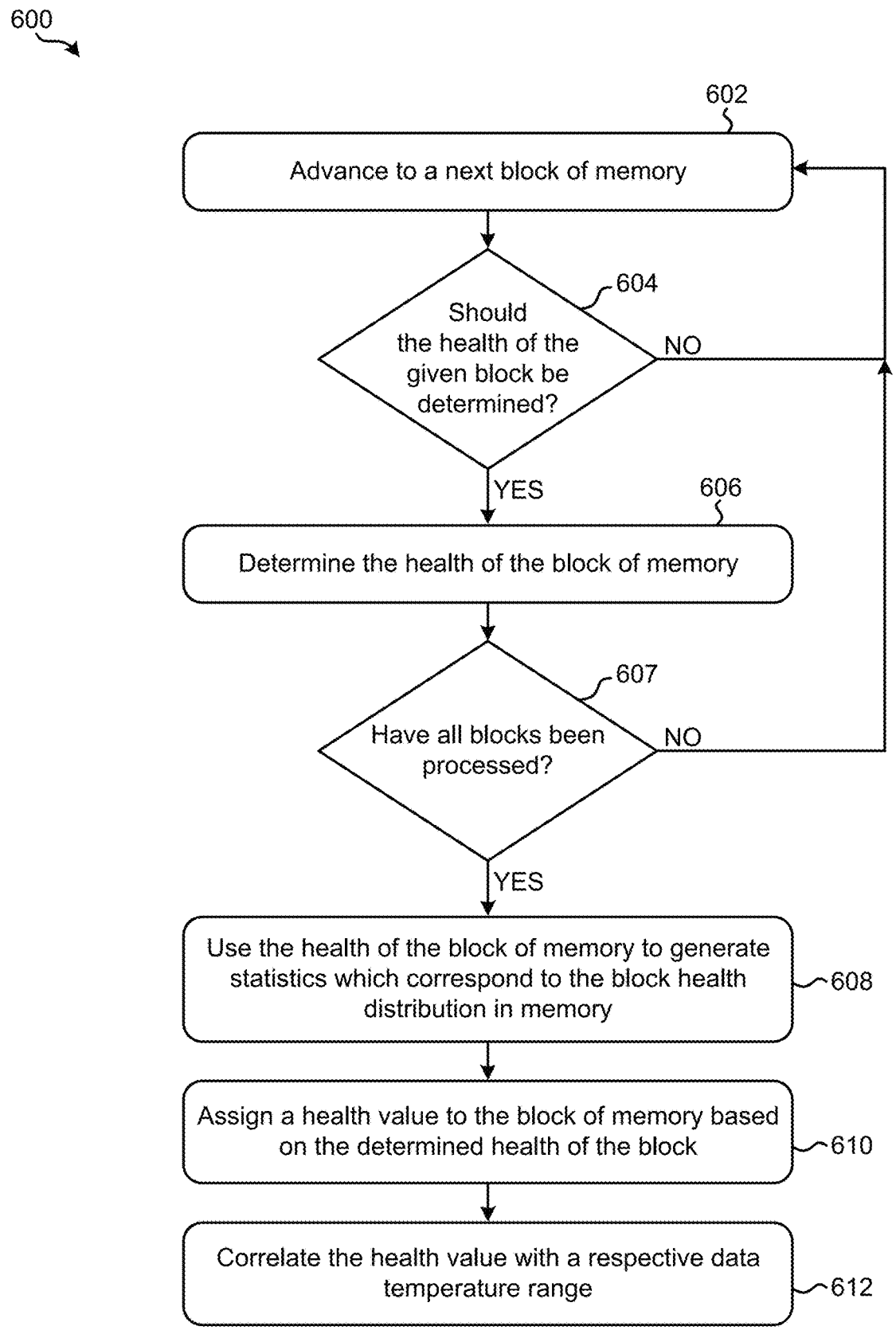
FIG. 6A is a flowchart of a method, in accordance with one embodiment.

Looking now to FIG. 6A, a method 600 for selectively wear leveling blocks of memory is shown according to one embodiment. The method 600 may be performed in accordance with the present invention in any of the environments depicted in FIGS. 1-5, among others, in various embodiments. Of course, more or less operations than those specifically described in FIG. 6A may be included in method 600, as would be understood by one of skill in the art upon reading the present descriptions.

Each of the steps of the method 600 may be performed by any suitable component of the operating environment. For example, in various embodiments, the method 600 may be partially or entirely performed by a hybrid controller, a controller, a processor, a computer, etc., or some other device having one or more processors therein. Thus, in some embodiments, method 600 may be a computer-implemented method. In such embodiments, the computer used to implement the method may include a memory module itself or a portion thereof, e.g., such as the hybrid controller. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6A, operation 602 of method 600 includes advancing to a next block of memory. With respect to the present description, "a next block of memory" may vary depending on the given approach. For instance, upon initiating method 600, a next block of memory may simply be a first block of memory. In other approaches, a next block of memory may be a next logical block of memory. Moreover, operation 602 may progress between the blocks of memory in any desired manner, e.g., sequentially, randomly, using a pattern, etc. Moreover, operation 602 may be triggered periodically, e.g., every 1 week, by a background process that examines all the NAND blocks, or may be triggered on demand, e.g., in the event of a page read in a block exhibiting a high bit error count or an ECC failure. Moreover, the memory preferably includes NVRAM, and the blocks are preferably configured in multi-bit-per-cell mode. For instance, in some approaches the memory includes 3-D TLC NAND Flash, while in other approaches the memory includes 3-D QLC NAND Flash. In further approaches, the memory includes 3-D PLC NAND Flash. Furthermore, the selected block may correspond to a given LEB. For simplicity, the term "block" is used in the context of methods 600, 630, and 670 to denote either a single physical block or multiple physical blocks organized into an LEB.

Decision 604 further includes determining whether the health of the given block of memory should be determined. In preferred approaches, decision 604 involves determining whether the given block is configured in multi-bit-per-cell mode. By only actively determining the health of blocks of memory which are configured in multi-bit-per-cell mode, the approaches described herein are able to significantly reduce the amount of metadata and computational overhead that is experienced by the system as a whole. Previously determined health information pertaining to a block may also be retained while the block is configured in SLC mode, thereby further improving performance of the system, e.g., by enabling wear leveling for such blocks. In other words, health binning of blocks in SLC mode may still be accomplished by using health information that had been determined while the block was configured in a different mode (e.g., QLC mode). The health of a block may even change while the block is in SLC mode, but this change will only be realized and acted upon after the block is configured in multi-bit-per-cell mode again, e.g., as will soon become apparent.

In response to determining that the health of the given block of memory should not be determined, (e.g., that the block is configured in SLC mode) method 600 returns to operation 602 whereby a next block is advanced to before repeating decision 604. It follows that the health of a block of memory is intentionally not determined while the block is configured in SLC mode. However, in response to determining that the block is configured in multi-bit-per-cell mode, and therefore that the health of the given block should be determined, method 600 proceeds to operation 606.

There, operation 606 includes actively determining the health of the block of memory. It is preferred that the health of a block is determined in the background such that latency is not introduced. Accordingly, operation 606 may be selectively performed during periods of relatively low computational processing and/or removed from nominal memory operations. Depending on the approach, the health of a block of memory may be determined in a number of different ways which would be apparent to one skilled in the art after reading the present description. For instance, in some approaches the health of a block may be determined using base calibrations which track permanent changes in the underlying threshold voltage distributions and corresponding error count information from program-erase cycling. In other approaches, one or more sample read operations may be performed on the block of memory (e.g., read scrubbing). The raw bit error rate (RBER) or error count experienced by the various codewords in the block would thereby provide an indication of the block's health. In some instances, the RBERs for the block may be averaged, the highest RBER may be selected, the lowest RBER may be chosen, etc. to determine the health of the given block. Moreover, it should be noted that the higher the RBER value, the less healthy the corresponding block is. The method then proceeds to operation 607 where it is determined if all blocks have been processed or not. In response to determining that at least one of the blocks in memory has not yet been processed, method 600 returns to operation 602 such that the at least one remaining block may be advanced to. However, in response to determining that all blocks in memory have been processed, method 600 proceeds to operation 608.

Proceeding to operation 608, the health of the block of memory is used to generate statistics which correspond to the block health distribution in memory. In some approaches, the health of the block is given by the determined health from operation 606. In other approaches a previously determined health for the block from an earlier execution of method 600 is used and/or the health of the block is estimated, e.g., as will be described in further details below. It is well understood that the source of the block health used in this operation, namely currently or previously determined or estimated, may differ for different blocks.

Regarding the generation of the statistics, for instance, in some approaches the health of the block may be compared against an accumulation of block health information for the other blocks in memory. This comparison may be able to create a histogram of the block health distribution, and determine where the health of the present block is situated, at least with respect to the other blocks that are configured in multi-bit-per-cell mode. In some approaches, the health of the block may even be compared against the values that have been stored for the blocks that are currently configured in SLC mode.

These statistics and the determined health of the block may further be used to establish a health value or health grade which represents the current state of the block with respect to the other blocks in the memory. In a preferred embodiment, the health value typically corresponds to the health of the block at the point it had been determined or estimated, and the health grade is assigned to blocks based on the latest health value periodically (e.g., every week, or after a certain number of writes). Moreover, one or more consecutive health values may be mapped to a single health grade. In other embodiments, the determined health value directly maps to a health grade and the terms health value and health grade can be used interchangeably.

Accordingly, operation 610 includes assigning a health value to the block of memory based on the determined health of the block. The statistics generated in operation 608 may also be used to determine and assign a health value to the block. The health value that is assigned to a block of memory is preferably maintained (e.g., in a lookup table) such that it may be utilized in the process of placing the block in one of a number of available ready-to-use (RTU) queues that are associated with the pool of blocks configured in multi-bit-per-cell mode after the block has been erased, e.g., as will be described in further detail below.

Referring still to operation 608, it follows that the health value that is assigned to a given block depends, at least in part, on the health values that have been assigned to various other blocks in memory. In other words, the health values of the blocks are interrelated. According to an example, which is in no way intended to limit the invention, a certain percentage of healthiest blocks may be assigned a highest (e.g., best) health grade, another percentage of the unhealthiest blocks may be assigned a lowest (e.g., worst) health grade, while the remaining blocks may be assigned a health grade that is between the highest and lowest health grades.

Operation 612 further includes correlating the health value with a respective data temperature range. As mentioned above, data having different temperatures result in a different number of P/E cycles being performed. As a result, healthier blocks are preferably used to store data that has a hotter temperature, while less healthy blocks are used to store data that has a colder temperature (at least with respect to the hot data). Doing so desirably causes the health of each respective block in memory to converge towards a moving average and maintain efficient performance. It follows that operation 612 preferably includes correlating higher health values with hotter data temperature ranges, and correlating lower health values with lower data temperature ranges. This effectively creates a relationship between certain pairs of health values and data temperature ranges which is further reflected in the RTU queues associated with the pool of blocks configured in multi-bit-per-cell mode.

As noted above, a number of RTU queues may be used to perform health leveling for blocks configured in multi-bit-per-cell mode. Referring momentarily to the data and block flow overview 700 in FIG. 7, it is apparent that while there is only one RTU queue 708 which corresponds to the blocks configured in SLC mode, a number of RTU queues 710 correspond to the blocks that are configured in multi-bit-per-cell mode. Each of the multiple RTU queues 710 preferably correspond to a different one of the health values that are assigned to the various blocks in memory. This allows for blocks to be organized in the RTU queues 710 based on the health values that have been assigned to them, thereby improving the efficiency by which blocks are assigned to data of different temperatures. Performance of the system as a whole is improved as a result of this, e.g., as will be described in further detail below.

Figure 6B:
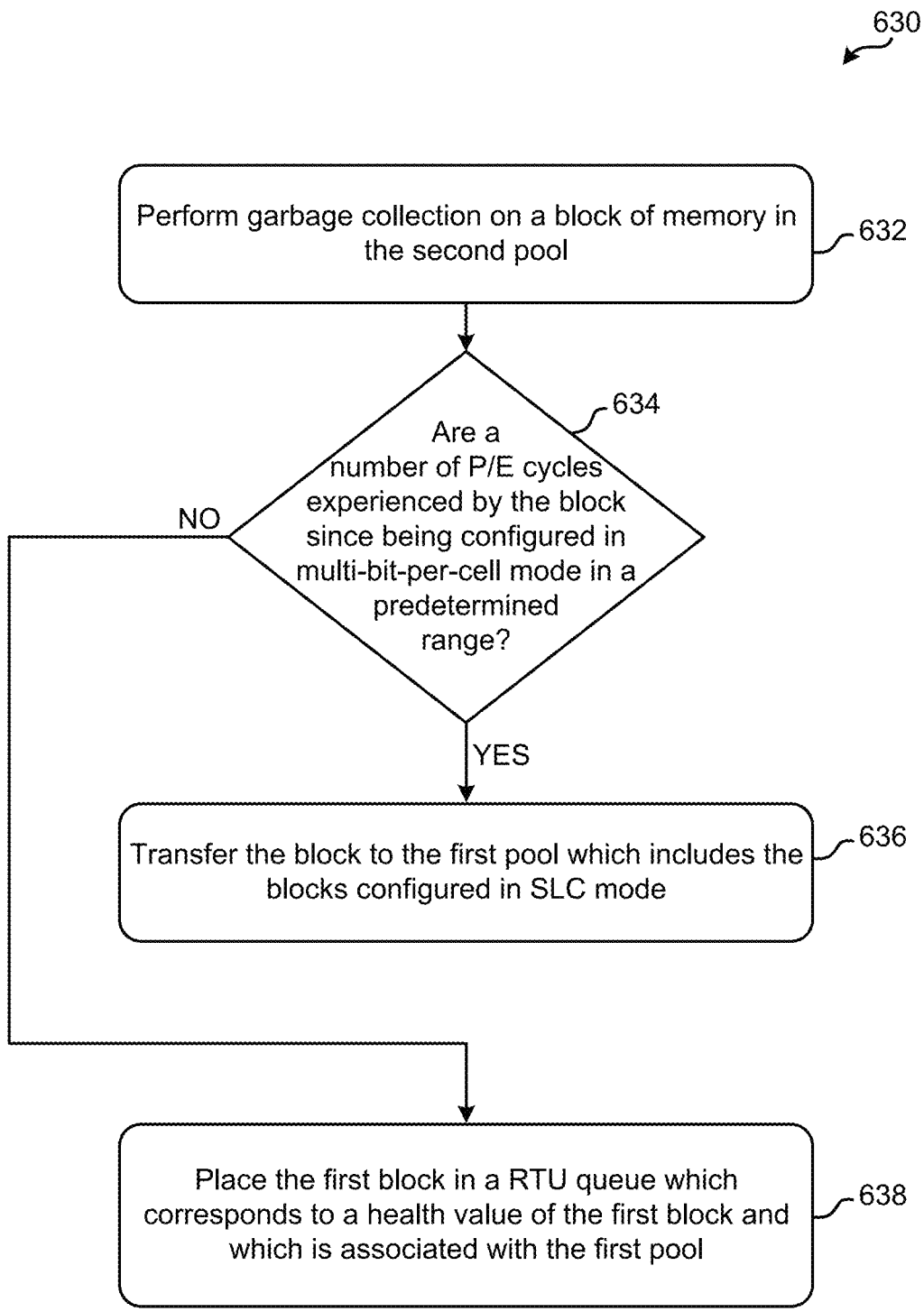
FIG. 6B is a flowchart of a method, in accordance with one embodiment.

Looking now to FIG. 6B, a method 630 for garbage collecting and repurposing blocks of memory is shown according to one embodiment. Method 630 is described in the context of a non-volatile memory module having first and second block pools, each of the pools being used to store blocks having a different configuration. For instance, the first pool is designated as including those blocks which are configured in SLC mode, while the second pool includes the blocks configured in multi-bit-per-cell mode (e.g., see 504, 506 of FIG. 5). However, the method 630 may be performed in accordance with the present invention in any of the environments depicted in FIGS. 1-5, among others, in various embodiments. Of course, more or less operations than those specifically described in FIG. 6B may be included in method 630, as would be understood by one of skill in the art upon reading the present descriptions.

Each of the steps of the method 630 may be performed by any suitable component of the operating environment. For example, in various embodiments, the method 630 may be partially or entirely performed by a hybrid controller, a controller, a processor, a computer, etc., or some other device having one or more processors therein. Thus, in some embodiments, method 630 may be a computer-implemented method. In such embodiments, the computer used to implement the method may include a memory module itself or a portion thereof, e.g., such as the hybrid controller. In preferred approaches, the various processes included in method 630 are performed in parallel with those of method 600. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 630. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6B, operation 632 of method 630 includes performing garbage collection on a block of memory in the second pool. As noted above, the second pool preferably includes the blocks that are configured in multi-bit-per-cell mode. In other words, operation 632 may include performing garbage collection on one of the blocks in the second pool 506 of FIG. 5. The garbage collection may be performed using any processes which would be apparent to one skilled in the art after reading the present description.

Moreover, decision 634 includes determining whether a number of P/E cycles experienced by the block since being configured in multi-bit-per-cell mode is in a predetermined range. As previously mentioned, the health of the blocks in memory change over time as they are subjected to different levels of use. Accordingly, blocks configured in multi-bit-per-cell mode in the second pool begin to degrade more quickly over time compared to the blocks configured in SLC mode in the first pool. In an effort to achieve wear leveling across the memory, blocks may be transferred between these pools.

The frequency and/or number of blocks that are transferred between the pools may vary depending on the approach. For instance, additional performance data such as an amount of time, a number of read errors experienced, etc., since the given block was calibrated in its current mode may also be evaluated in order to make the determination as to whether the block should be transferred to the other pool. In further approaches, criteria may be implemented which identify when and if a particular block should also be recalibrated from its current mode to another as a part of the transfer process. For example, a block may be recalibrated and transferred to another pool after experiencing a predetermined number of P/E cycles (e.g., 500 P/E cycles), experiencing an undesirably low performance metric (e.g., the number of bit errors exhibiting a predetermined error count threshold), a predetermined amount of time has passed since a last recalibration, etc. This allows for some reduction in the amount of computing overhead experienced, e.g., as would be appreciated by one skilled in the art after reading the present description.

Method 630 proceeds to operation 636 in response to determining that the number of P/E cycles experienced by the block since being configured in multi-bit-per-cell mode is in the predetermined range. There, operation 636 includes transferring the block to the first pool after the erase operation which includes the blocks being configured in SLC mode. In other words, operation 636 includes transferring the block (which has undergone garbage collection and an erase operation) to an RTU queue that is associated with the first pool 504 of FIG. 5.

According to the present description, a block that is "transferred" between pools, or between queues, remains physically in the same plane and channel of memory. In other words, while the functional characteristics of the given block may change as a result of activating and/or deactivating certain bits in each of the cells therein, the blocks themselves do not physically move in the memory. Rather, the blocks are "transferred" between pools, or between queues, in a logical sense.

It should also be noted that any one or more of the processes included in method 630 may be applied to blocks that are configured in SLC mode. For instance, a determination may be made as to whether a number of P/E cycles experienced by the first block since being configured in SLC mode is in a second predetermined range. In response to determining that the number of P/E cycles experienced by the first block since being configured in SLC mode is not in the second predetermined range, the first block may be placed in an RTU queue that is associated with the first pool. However, in response to determining that the number of P/E cycles experienced by the first block since being configured in SLC mode is in the second predetermined range, the first block is preferably transferred to the second pool.

Figure 6C:
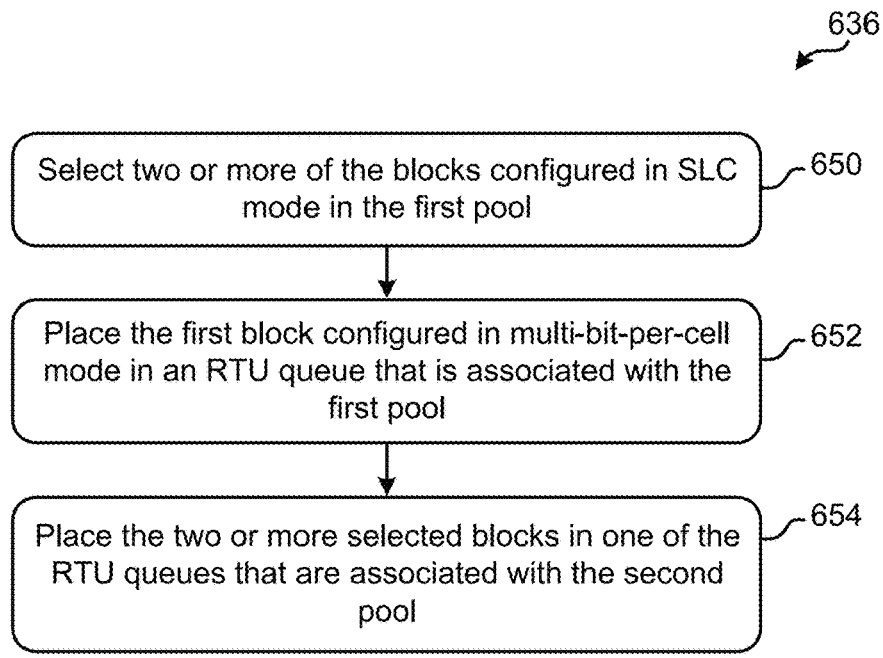
FIG. 6C is a flowchart of sub-processes for one of the operations in the method of FIG. 6B, in accordance with one embodiment.

As noted above, in some approaches the process of transferring the block to the first pool may involve reconfiguring the block during the process. Thus, the transfer operation may involve specifying the target mode of the block. Further, the specified target mode may be an integral part of performing the block erase operation. In some approaches these transfers are indicated in an LPT, an operations log, a block status table, etc. Referring momentarily to FIG. 6C, exemplary sub-processes of transferring the block to the first pool which includes the blocks configured in SLC mode are illustrated in accordance with one embodiment, one or more of which may be used to perform operation 636 of FIG. 6B. However, it should be noted that the sub-processes of FIG. 6C are illustrated in accordance with one embodiment which is in no way intended to limit the invention.

As shown, sub-operation 650 includes selecting two or more of the blocks configured in SLC mode in the first pool. It is desirable that the storage capacities of the two pools is kept about the same despite transferring blocks configured in different modes therebetween. The selection of two or more block configured in SLC mode may, for example, be done by the garbage collector or wear leveler. This selection may be based on the amount of invalid data, the retention time, the number of reads the blocks have experienced since being programmed, the number of P/E cycles of the block since placed in the SLC pool, etc. However, any other suitable component in the controller may also or alternatively be used to make this selection.

In yet another embodiment, the two or more blocks may be selected from a queue holding blocks to be erased. It will be appreciated by one skilled in the art that depending on the selection process used, selected block may first have to be garbage collected when they still hold valid data and/or erased before being transferred. Accordingly, while only one block is being transferred into the first pool, that block is configured in multi-bit-per-cell mode and is not reconfigured into SLC mode before being transferred, i.e., before being erased. Depending on the actual configuration of the block configured in multi-bit-per-cell mode, two or more of the blocks in the first pool configured in SLC mode will be transferred to the second pool in order to maintain balance therebetween. For example, a block configured in QLC mode being transferred into the first pool would result in four blocks configured in SLC mode to be selected in sub-operation 650. It should be noted here that the sub-processes in the sub-procedure described in FIG. 6C may be executed in the specified order, in a similar order, or in a different order altogether. Moreover, individual operations may even be substantially deferred with respect to each other. In still other embodiments sub-processes may be skipped partially. According to an example, certain sub-processes in FIG. 6C may be skipped in situations where the pool sizes are resized, e.g., as would be appreciated by one skilled in the art after reading the present description.

Sub-operation 652 further includes placing the first block configured in multi-bit-per-cell mode in an RTU queue that is associated with the first pool. Moreover, sub-operation 654 includes placing the two or more selected blocks (that are configured in SLC mode) in one of the RTU queues that are associated with the second pool. This is again able to desirably keep the overall storage capacity of the two pools about constant.

Figure 6D:
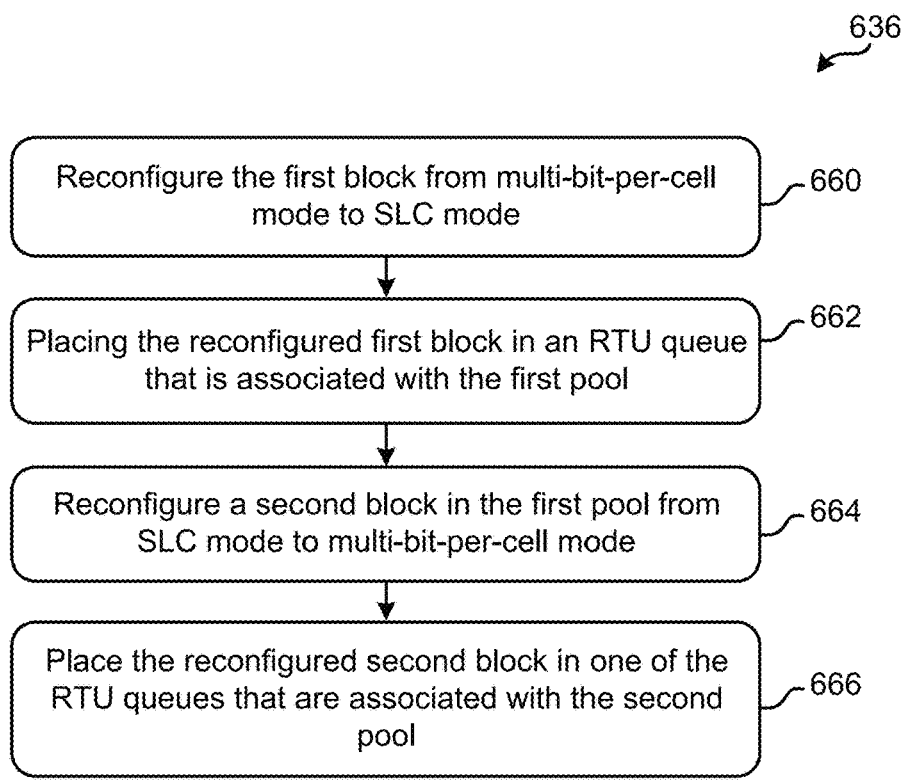
FIG. 6D is a flowchart of sub-processes for one of the operations in the method of FIG. 6B, in accordance with one embodiment.

While some approaches allow the blocks to maintain their configuration despite being transferred between the pools, other approaches involve reconfiguring the blocks. For instance, looking now to FIG. 6D, exemplary sub-processes of transferring the block to the first pool which includes the blocks configured in SLC mode are illustrated in accordance with one embodiment, one or more of which may be used to perform operation 636 of FIG. 6B. However, it should be noted that the sub-processes of FIG. 6D are illustrated in accordance with one embodiment which is in no way intended to limit the invention.

As shown, sub-operation 660 includes reconfiguring the first block from multi-bit-per-cell mode to SLC mode. The process of reconfiguring a given block of memory may involve making adjustments to the logical and/or physical configuration of the block such that the structure is able to perform differently than before. For example, one or more circuits at the physical location in memory which corresponds to the given block may be activated and/or deactivated depending on the approach.

Proceeding to sub-operation 662, the reconfigured first block is placed in an RTU queue that is associated with the first pool. As noted above, this block being reconfigured and transferred to the first pool has already undergone a garbage collection process. However, in other approaches the block may contain valid data which is preferably relocated prior to reconfiguring or transferring the block between the pools, e.g., as would be appreciated by one skilled in the art after reading the present description.

Sub-operation 664 further includes reconfiguring a second block in the first pool from SLC mode to multi-bit-per-cell mode, while sub-operation 666 includes placing the reconfigured second block in one of the RTU queues that are associated with the second pool. While the sub-operations in FIG. 6C involve transferring different numbers of memory blocks between the two block pools, this stems from the fact that blocks configured in different modes typically have different storage capacity characteristics. In contrast, the sub-operations in FIG. 6D involve reconfiguring the blocks that are being transferred between the pools such that storage capacity is conserved at both ends of the transfer process.

It should also be noted that the reconfigured block being transferred to the second pool is preferably placed in an RTU queue which corresponds to a last (e.g., stored) health value or health grade of the given block. Although health values are not determined for blocks configured in SLC mode, a last health value determined for the block while it was previously configured in multi-bit-per-cell mode may be accessed (e.g., from a lookup table) and used to place the newly reconfigured block in a desirable RTU queue, e.g., as will be described in further detail below. Furthermore, the health grade of a block configured in SLC mode may have changed even though the health value of the block has not been determined while being in the SLC pool. Typically, this is because the distribution of block health grades may be determined relative to the health values of all blocks (e.g., other blocks may experience a significant change in health compared to the block in the SLC pool) and may have been updated in the background in the meantime.

While blocks of memory may be transferred between the pools and/or reconfigured a number of times, there are some situations in which a block is preferably restricted to a particular configuration and/or block pool. For example, blocks which are performing undesirably poorly may be restricted to being configured in SLC mode and/or being in the first pool. As noted above, memory blocks having a single-bit-per-cell configuration experience write latencies that are up to about 10 times lower than experienced by memory blocks having multi-bit-per-cell configurations. Similarly, memory blocks having a single-bit-per-cell configuration experience lower read latencies than memory blocks having multi-bit-per-cell configurations. In other words, the voltage distributions in single-bit-per-cell configuration can be wider than in multi-bit-per-cell configurations without affecting the error rate, as less thresholds have to be applied. It follows that restricting poorly performing blocks to being configured in SLC mode allows for the system to maintain accurate performance.

The various processes included herein are thereby preferably able to identify a block that is experiencing undesirably poor health and permanently transferring the identified unhealthy block to the first pool, or at least until the block is retired from further use. In some approaches these poor performing blocks may be identified by evaluating various performance data and determining whether the corresponding values are outside predetermined ranges.

Returning now to decision 634 of FIG. 6B, method 630 proceeds to operation 638 in response to determining that the number of P/E cycles experienced by the first block since being configured in multi-bit-per-cell mode is not in the predetermined range. There, operation 638 includes placing the first block in an RTU queue which corresponds to a health grade of the first block and which is associated with the first pool. As noted above, the second pool may have more than one different RTU queue, each of which corresponds to a different one of the health grades that are assigned to the various blocks in the second pool. This allows for blocks having the same or similar health to be accumulated together in each of the respective RTU queues. The health grade associated with each of the RTU queues may further be correlated to a different data temperature range in order to better connect certain types of data with blocks of memory which have the appropriate health levels to service the types of data, e.g., as would be appreciated by one skilled in the art after reading the present description.

Figure 6E:
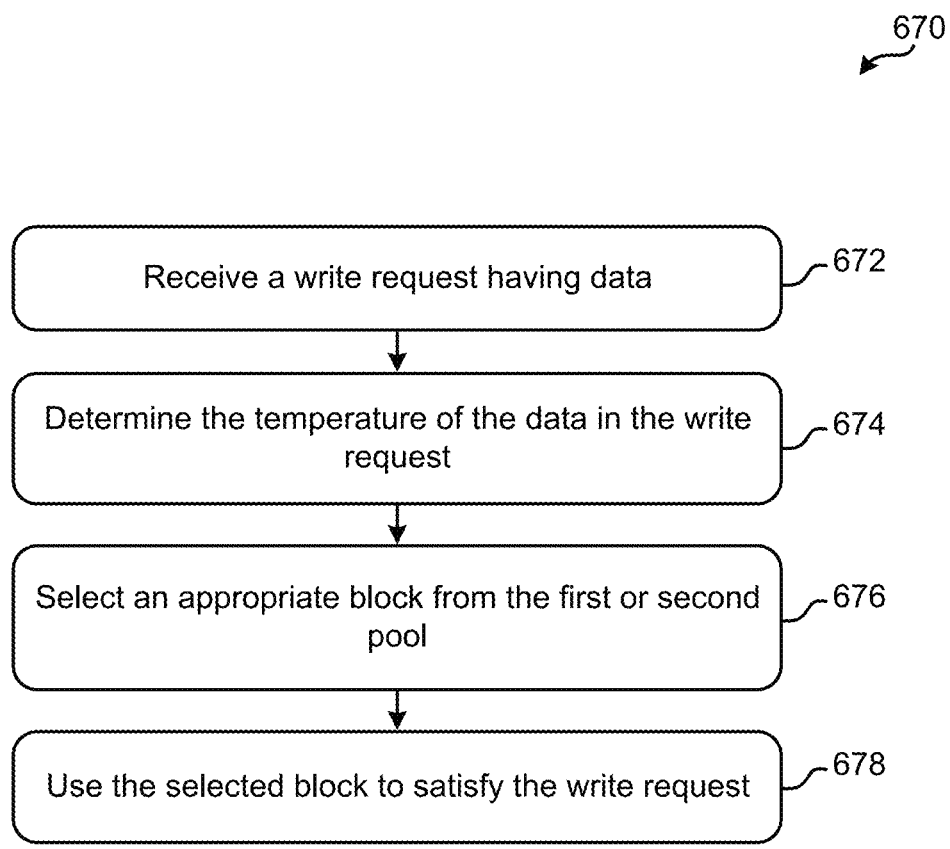
FIG. 6E is a flowchart of a method, in accordance with one embodiment.

FIG. 6E illustrates another method 670 for satisfying received write requests is shown according to one embodiment. Method 670 is described in the context of a non-volatile memory module having first and second block pools, each of the pools being used to store blocks having a different configuration. For instance, the first pool is designated as including those blocks which are configured in SLC mode, while the second pool includes the blocks configured in multi-bit-per-cell mode (e.g., see 504, 506 of FIG. 5). However, the method 670 may be performed in accordance with the present invention in any of the environments depicted in FIGS. 1-5, among others, in various embodiments. Of course, more or less operations than those specifically described in FIG. 6E may be included in method 670, as would be understood by one of skill in the art upon reading the present descriptions.

Each of the steps of the method 670 may be performed by any suitable component of the operating environment. For example, in various embodiments, the method 670 may be partially or entirely performed by a hybrid controller, a controller, a processor, a computer, etc., or some other device having one or more processors therein. Thus, in some embodiments, method 670 may be a computer-implemented method. In such embodiments, the computer used to implement the method may include a memory module itself or a portion thereof, e.g., such as the hybrid controller. In preferred approaches, the various processes included in method 670 are performed in parallel with those of method 600 and/or method 630. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 670. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6E, operation 672 of method 670 includes receiving a write request having data. Depending on the approach, the write request may be received from a user (e.g., a host), a running application, controller internal data relocation such as garbage collection, wear leveling, another memory module, etc. Moreover, operation 674 includes determining the temperature of the data in the write request. The temperature of the data in the write request may be determined in a number of different ways, e.g., depending on the desired approach. For instance, in some approaches the temperature of the data may be determined by sampling a portion of the data to determine the temperature that is associated therewith. In other approaches, the write request may be compared to previously received write requests to determine the relative temperature of the data that is included therein.

Proceeding to operation 676, method 670 includes selecting an appropriate block from the first or second pool. In situations where a write cache (e.g., see 302 of FIG. 3 above) already holds a block from the appropriate RTU of the pools, and the block still has free pages to write to, the block from the write cache is selected in operation 676. Otherwise, operation 676 selects a block from one of a number of RTU queues that are associated with the first or second pool. Doing so moves the selected block from the RTU into the write cache. Note that in approaches that organize multiple physical blocks into LEBs, physical blocks in the RTUs are preferably not yet organized into LEBs. Hence the process of selecting a block here includes the grouping of multiple physical blocks preferably from different channels into one LEB, e.g., as would be appreciated by one skilled in the art after reading the present description.

Again, the second pool may have more than one different RTU queue, each of which corresponds to a different one of the health values that are assigned to the various blocks in the second pool. This allows for blocks having the same health to be accumulated together in each of the respective RTU queues. The health grade associated with each of the RTU queues may further be correlated to a different data temperature range in order to better connect certain types of data with blocks of memory which have the appropriate health levels to service the types of data. It follows that the block selected in operation 676 originates preferably from an RTU queue which corresponds to a health grade that is also correlated with the temperature of the data that is received in the write request. Furthermore, operation 678 includes using the selected block to satisfy the write request.

Figure 7:
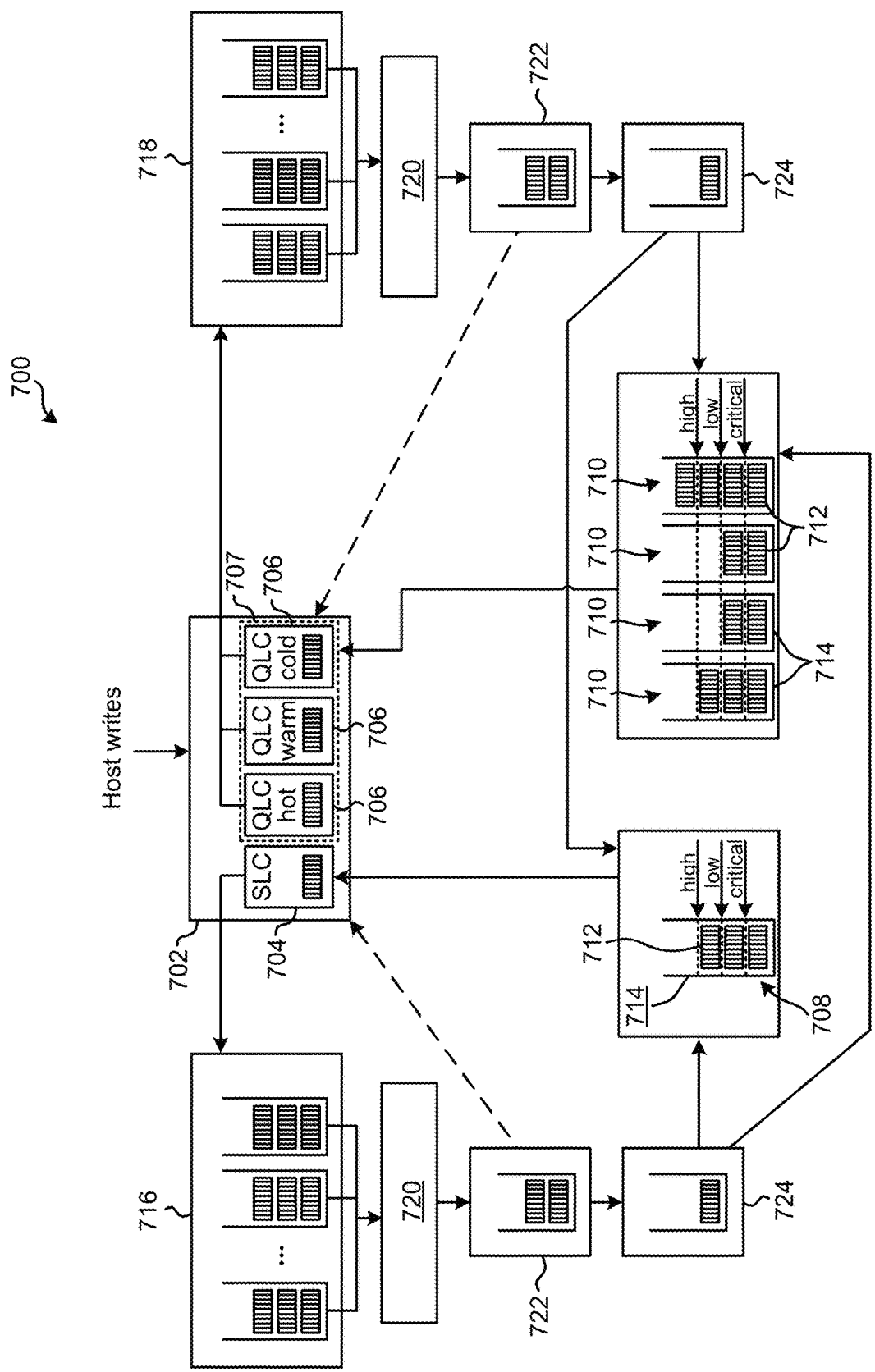
FIG. 7 is a partial representational view of a data and block flow overview, in accordance with one embodiment.

Looking now to FIG. 7, a data and block flow overview 700 is illustrated in accordance with one embodiment. As an option, the present data and block flow overview 700 may be implemented in conjunction with features from any other embodiment listed herein, such as those described with reference to the other FIGS., such as FIGS. 6A-6D. However, such data and block flow overview 700 and others presented herein may be used in various applications and/or in permutations which may or may not be specifically described in the illustrative embodiments listed herein. Further, the data and block flow overview 700 presented herein may be used in any desired environment. Thus FIG. 7 (and the other FIGS.) may be deemed to include any possible permutation.

As shown, host writes are received by a data placement module 702 which includes a LEB 704 consisting of one or more blocks of memory that are configured in SLC mode as well as a number of LEBs 706, each of which include one or more blocks of memory configured in multi-bit-per-cell mode, more specifically QLC mode in the present embodiment which is in no way intended to be limiting. The LEBs 706 are included in an QLC LEB module 707 which preferably receives empty blocks from the various RTU queues 710 and uses the received blocks to satisfy write requests that are received. Each of the LEBs 706 also correspond to a different data temperature which have been identified as "hot", "warm", and "cold", which is in no way intended to limit the invention. The different data temperatures may be identified using any desired distinguishing features.

New data is first written to LEBs with blocks configured in SLC mode in some approaches, thereby allowing for the new data to benefit from the lower latencies and higher throughput associated with blocks in SLC mode (e.g., compared to blocks configured in multi-bit-per-cell mode). However, in situations involving high host and internal write loads, new data may be stored directly in blocks that are configured in multi-bit-per-cell mode. Blocks configured in SLC mode are received from a single RTU queue 708, while blocks configured in multi-bit-per-cell mode are received from a set of RTU queues 710. It follows that each of the RTU queues 708, 710 may include a plurality of memory blocks 712, each of which are accumulated in RTU queues for different planes and channels 714, e.g., as would be appreciated by one skilled in the art after reading the present description. For simplicity, the memory blocks 712 in the RTU queues 708, 710 are organized into LEBs in FIG. 7. However, a preferred embodiment may maintain separate RTUs for different planes and channels 714 such that a LEB is built when the blocks are moved to the data placement unit 702.

As noted above, each of the RTU queues 710 correspond to a different one of the health values that are assigned to the various blocks of memory. These different health values have been identified as "healthy", "moderately healthy", "moderately unhealthy", and "unhealthy", which are again in no way intended to limit the invention. The health value associated with each of the RTU queues 710 may further be correlated to a different data temperature range in order to better connect certain types of data with blocks of memory which have the appropriate health levels to service the types of data.

Each of the RTU queues 710 associated to a plane and channel are depicted as having a number of different thresholds which correspond to the number of memory blocks that are included in the respective RTU queue 710. Here, "high", "low", and "critical" thresholds are implemented, each of which signify a different fill level for the respective channels in the respective RTU queues 708, 710.

In response to filling a given block or memory with data at the data placement module 702, the LEB is transferred to the respective one of the occupied block queues. Specifically, the LEBs configured in SLC mode are transferred to the SLC occupied block queues 716, while the LEBs configured in multi-bit-per-cell mode are transferred to the multi-bit-per-cell occupied block queues 718. The number of LEBs included in each of the occupied block queues 716, 718 changes over time. Therefore, the amount of information stored in (e.g., the effective size of) each of the queues 716, 718 also varies over time.

Over time, LEBs are eventually transitioned from the queues 716, 718 to the garbage collector and wear leveler modules 720. In some approaches, the LEBs are progressed to the garbage collector and wear leveler modules 720 according to standard garbage collection procedures. For example, as data in the blocks of a LEB is invalidated over time (e.g., due to rewrite operations, deletions, etc.), the LEB may be specified for garbage collection. However, in other approaches LEBs may be selected and processed by the garbage collector and wear leveler modules 720 according to any of the processes described herein. For instance, in some embodiments, LEBs may be further selected by the garbage collector or wear leveler based on the retention time or the number of reads the blocks in the LEB have seen, or the measured RBER.

From the garbage collector and wear leveler modules 720, LEBs advance to the data relocation module 722 which sends any valid data extracted from the blocks in the LEB back to the data placement module 702 (as represented by the dashed, arrowed lines). Accordingly, the data may be stored in another available LEB of memory. The blocks in the LEB are thereafter erased by the block erase modules 724. The erase operation may involve specifying the target mode of the block and the block erase module 724 may operate on LEBs or individual physical blocks.

Depending on the target block mode, erased blocks are either returned to the RTU queue which corresponds to the current mode in which the block is configured, or transferred to an RTU queue which corresponds to another configuration mode. In some approaches a block may even be reconfigured before being transferred. For example, an empty block configured in SLC mode is either returned to RTU queue 708, or transferred to one of the RTU queues 710. Moreover, the process of transferring the empty block to one of the RTU queues 710 may further involve reconfiguring the block in multi-bit-per-cell mode. Similarly, an empty block configured in in multi-bit-per-cell mode is either returned to one of the RTU 710 queues, or transferred to RTU queue 708. Again, the block may be reconfigured in SLC mode as a part of the transfer process in some approaches.

Accordingly, each of the block erase modules 724 are depicted as having two arrowed lines extending therefrom, each of these lines representing the possible paths of the blocks that are erased therein. This determination of whether to return a memory block to a matching RTU queue or reconfigure the block before adding it to a different RTU queue may be made based on any of the processes included in FIGS. 6A-6D as mentioned above. Further, the reconfiguration of a block may include the updating of a block status table.

It follows that various ones of the embodiments included herein are able to efficiently perform health binning in data storage environments having hybrid controllers. This is achieved by reducing metadata overhead while avoiding any degradation in achieved performance. The processes involved with performing the health binning may also be repeated at any desired frequency. For instance, the health binning may be repeated each week, after every 50 full device writes are performed, etc., depending on the desired approach.

As described herein, block health can be used to determine which blocks to reconfigure between multi-bit-per-cell mode and SLC mode, e.g., depending on the rate at which endurance is consumed. This decision may also be based on the relative pool sizes, the write amplification of each pool (which is a function of the workload and garbage collection strategy), the relative number of writes that are performed to each pool, the average endurance of a block in either mode, etc. For example, in situations where endurance is consumed faster in the SLC pool than in any of the multi-bit-per-cell RTU queues, healthy blocks are preferably transferred to the SLC pool. Similarly, when one of the multi-bit-per-cell RTU queues (for example the "hot" RTU queue) consumes endurance faster than the blocks in the SLC pool as well as the other multi-bit-per-cell RTU queues, healthy blocks are preferably transferred there.

Because the health of a block is not measured while the block is configured in SLC mode, and in view of the fact that blocks only experience a limited amount of P/E cycles in SLC mode before being reconfigured into multi-bit-per-cell mode, the precise health of blocks configured in SLC mode are not used. Rather, the last determined health value when the block was in multi-bit-per-cell mode and/or an estimation of the health of a block configured in SLC mode may be determined based on the P/E cycles experienced while configured in SLC mode and multi-bit-mode, the average block behavior obtained from characterization, the block behaviors from a small set of reference blocks obtained from characterization and/or modeling, etc.

It should be noted that blocks may be reordered in the RTU queues themselves. For instance, in some approaches the blocks are reordered in an RTU queue after performing health binning and new health grades are assigned. It should also be noted that although various ones of the approaches have been described herein in the context of two memory block pools, any of these approaches may be extended to embodiments having more than two block pools. In such embodiments, the target pool can be determined using priorities, based on user input, by comparing the RTU block levels of each respective pool and selecting the pool that has the lowest number of RTU blocks, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 8:
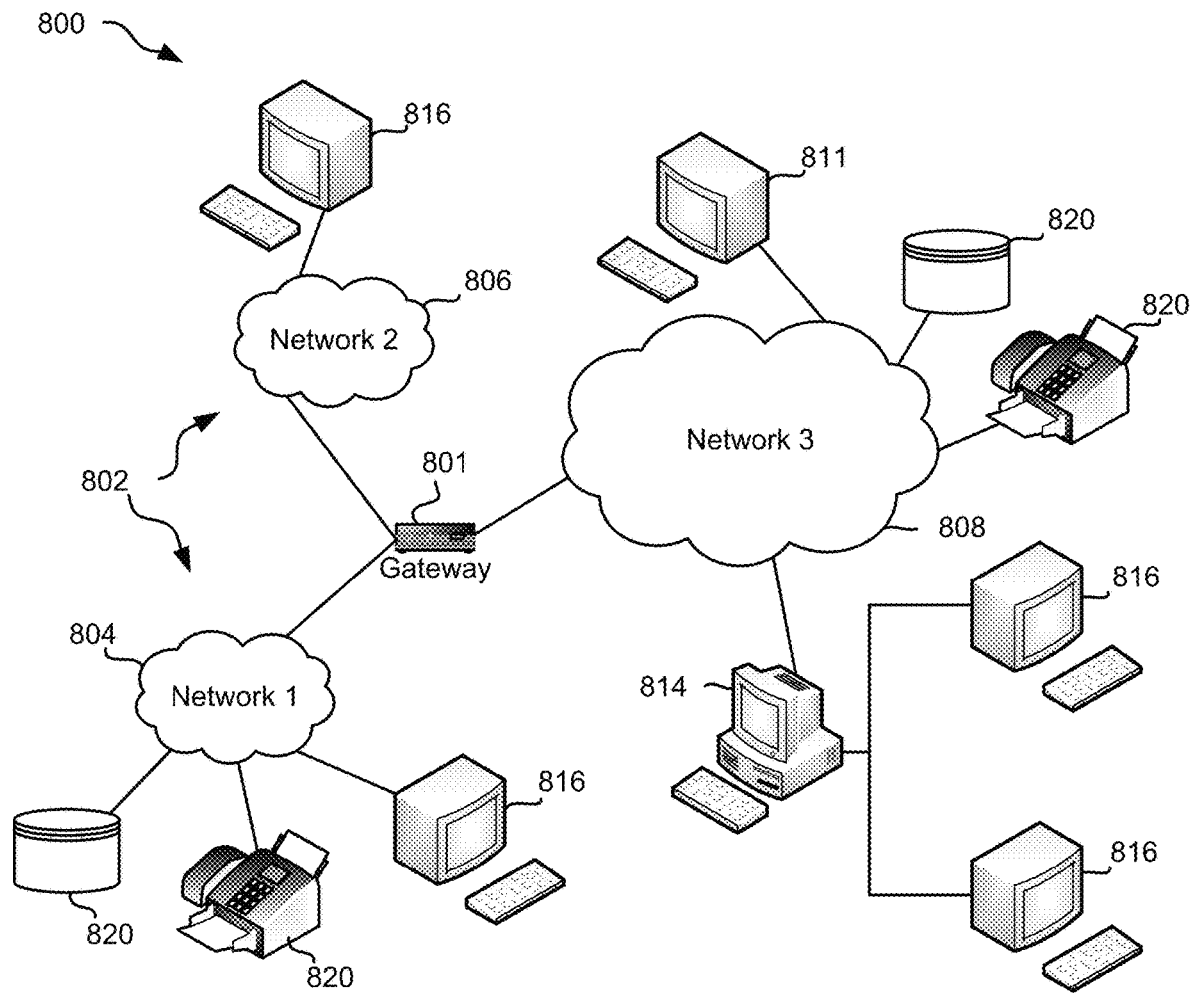
FIG. 8 is a network architecture, in accordance with one embodiment.

FIG. 8 illustrates a network architecture 800, in accordance with one embodiment. As shown in FIG. 8, a plurality of remote networks 802 are provided including a first remote network 804 and a second remote network 806. A gateway 801 may be coupled between the remote networks 802 and a proximate network 808. In the context of the present network architecture 800, the networks 804, 806 may each take any form including, but not limited to a LAN, a WAN such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, and which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, handheld computer, printer, and/or any other type of logic-containing device. It should be noted that a user device 811 may also be directly coupled to any of the networks, in some embodiments.

A peripheral 820 or series of peripherals 820, e.g., facsimile machines, printers, scanners, hard disk drives, networked and/or local data storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 804, 806, 808, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 9:
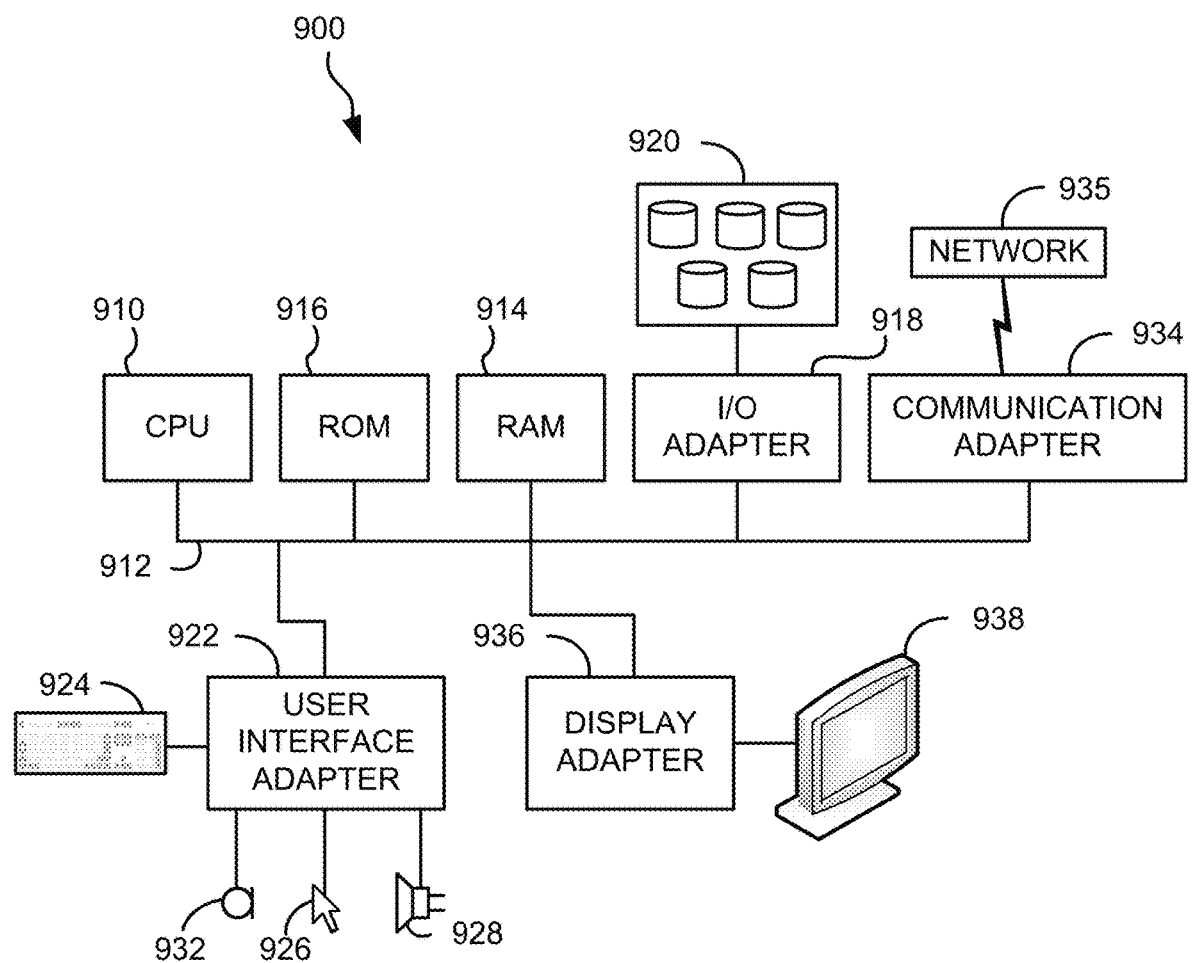
FIG. 9 is a representative hardware environment that may be associated with the servers and/or clients of FIG. 8, in accordance with one embodiment.

FIG. 9 shows a representative hardware environment associated with a user device 816 and/or server 814 of FIG. 8, in accordance with one embodiment. FIG. 9 illustrates a typical hardware configuration of a processor system 900 having a central processing unit 910, such as a microprocessor, and a number of other units interconnected via a system bus 912, according to one embodiment. In some embodiments, central processing unit 910 may include any of the approaches described above with reference to the one or more processors 210 of FIG. 2.

The processor system 900 shown in FIG. 9 includes a Random Access Memory (RAM) 914, Read Only Memory (ROM) 916, and an I/O adapter 918. According to some embodiments, which are in no way intended to limit the invention, I/O adapter 918 may include any of the approaches described above with reference to I/O adapter 218 of FIG. 2. Referring still to processor system 900 of FIG. 9, the aforementioned components 914, 916, 918 may be used for connecting peripheral devices such as storage subsystem 920 to the bus 912. In some embodiments, storage subsystem 920 may include a similar and/or the same configuration as data storage system 220 of FIG. 2. According to an example, which is in no way intended to limit the invention, storage subsystem 920 may include non-volatile data storage cards, e.g., having NVRAM memory cards, RAM, ROM, and/or some other known type of non-volatile memory, in addition to RAID controllers as illustrated in FIG. 2.

With continued reference to FIG. 9, a user interface adapter 922 for connecting a keyboard 924, a mouse 926, a speaker 928, a microphone 932, and/or other user interface devices such as a touch screen, a digital camera (not shown), etc., to the bus 912.

Processor system 900 further includes a communication adapter 934 which connects the processor system 900 to a communication network 935 (e.g., a data processing network) and a display adapter 936 which connects the bus 912 to a display device 938.

The processor system 900 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 10:
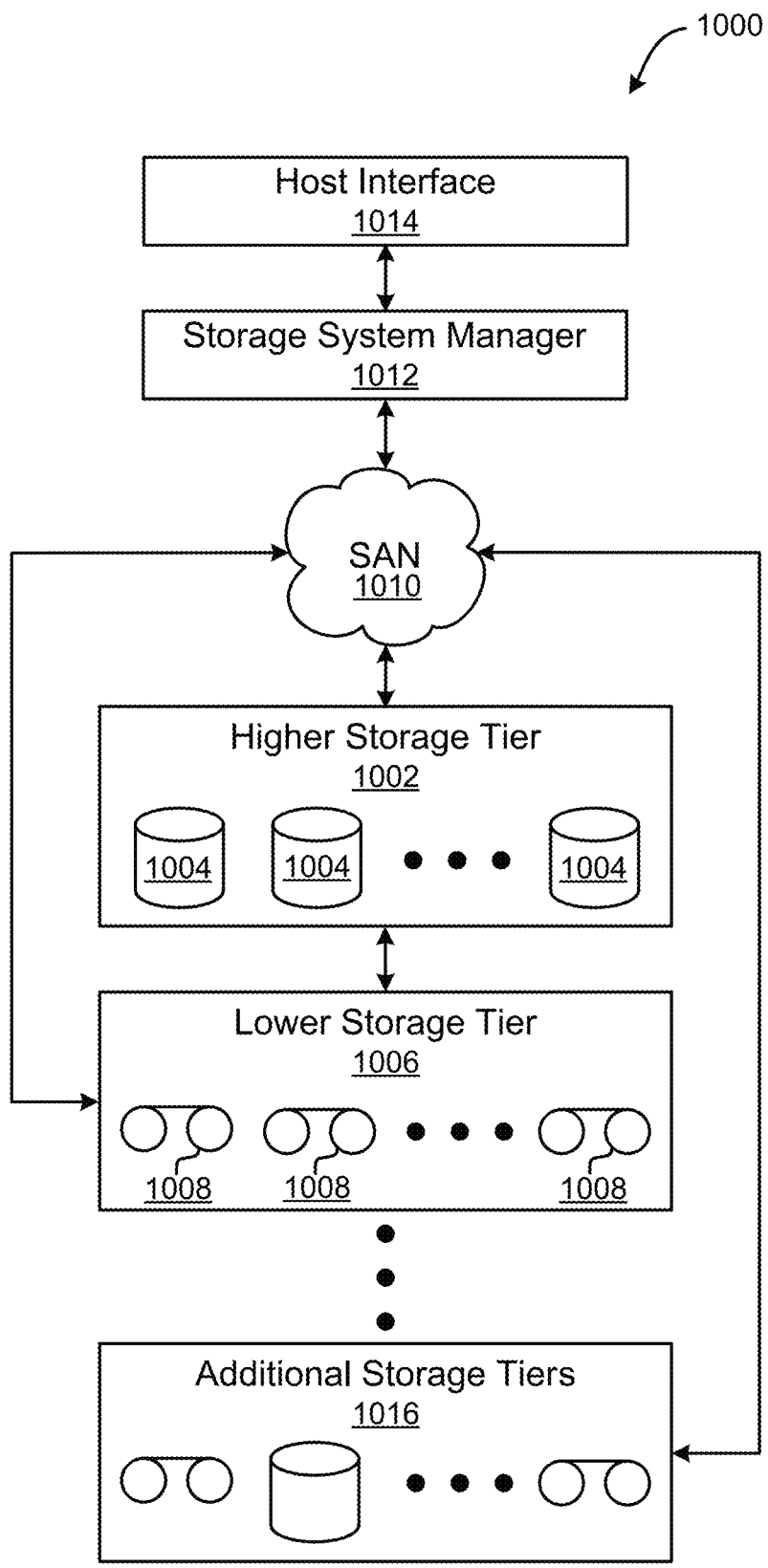
FIG. 10 is a tiered data storage system in accordance with one embodiment.

Moreover, FIG. 10 illustrates a storage system 1000 which implements high level (e.g., SSD) storage tiers in combination with lower level (e.g., magnetic tape) storage tiers, according to one embodiment. Note that some of the elements shown in FIG. 10 may be implemented as hardware and/or software, according to various embodiments. The storage system 1000 may include a storage system manager 1012 for communicating with a plurality of media on at least one higher storage tier 1002 and at least one lower storage tier 1006. However, in other approaches, a storage system manager 1012 may communicate with a plurality of media on at least one higher storage tier 1002, but no lower storage tier. The higher storage tier(s) 1002 preferably may include one or more random access and/or direct access media 1004, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 1002 depending on the desired embodiment.

Referring still to FIG. 10, the lower storage tier(s) 1006 preferably includes one or more lower performing storage media 1008, including sequential access media such as magnetic tape in tape drives and/or optical media, slower accessing HDDs, slower accessing SSDs, etc., and/or others noted herein or known in the art. One or more additional storage tiers 1016 may include any combination of storage memory media as desired by a designer of the system 1000. Thus, the one or more additional storage tiers 1016 may, in some approaches, include a SSD system architecture similar or the same as those illustrated in FIGS. 1-2. Also, any of the higher storage tiers 1002 and/or the lower storage tiers 1006 may include any combination of storage devices and/or storage media.

The storage system manager 1012 may communicate with the storage media 1004, 1008 on the higher storage tier(s) 1002 and lower storage tier(s) 1006 through a network 1010, such as a storage area network (SAN), as shown in FIG. 10, or some other suitable network type. The storage system manager 1012 may also communicate with one or more host systems (not shown) through a host interface 1014, which may or may not be a part of the storage system manager 1012. The storage system manager 1012 and/or any other component of the storage system 1000 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1000 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1002, may include a majority of SSD storage media for storing data in a higher performing storage environment, and remaining storage tiers, including lower storage tier 1006 and additional storage tiers 1016 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1002, while data not having one of these attributes may be stored to the additional storage tiers 1016, including lower storage tier 1006. Of course, one of skill in the art, upon reading the present descriptions, may devise many other combinations of storage media types to implement into different storage schemes, according to the embodiments presented herein.

According to some embodiments, the storage system (such as 1000) may include logic configured to receive a request to open a data set, logic configured to determine if the requested data set is stored to a lower storage tier 1006 of a tiered data storage system 1000 in multiple associated portions, logic configured to move each associated portion of the requested data set to a higher storage tier 1002 of the tiered data storage system 1000, and logic configured to assemble the requested data set on the higher storage tier 1002 of the tiered data storage system 1000 from the associated portions.

Of course, this logic may be implemented as a method on any device and/or system or as a computer program product, according to various embodiments.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for wear leveling blocks of memory, comprising:
   determining a health of blocks of memory which are configured in multi-bit-per-cell mode, wherein the blocks configured in multi-bit-per-cell mode are in a second pool, wherein blocks configured in single-level cell (SLC) mode are in a first pool, with a proviso that the health of a block of memory is not determined while the block is configured in SLC mode;
   assigning health values to the blocks of memory in the second pool based on the health of the respective block; and
   correlating each of the health values with a respective data temperature,
   wherein the second pool has more than one ready-to-use (RTU) queue associated therewith,
   wherein each of the RTU queues corresponds to a different health grade of the blocks in the second pool,
   wherein the health grades are derived from the health values.

2. The computer-implemented method of claim 1, comprising:
receiving a write request having data;
determining a temperature of the data in the write request;
selecting a block from one of the RTU queues associated with the second pool, wherein the one of the RTU queues corresponds to a health grade that is correlated with the temperature of the data in the write request; and
using the selected block to satisfy the write request.

3. The computer-implemented method of claim 1, comprising:
performing garbage collection on a first block in the second pool; and
placing the first block in one of the RTU queues which corresponds to a health grade of the first block and which is associated with the second pool.

4. The computer-implemented method of claim 3, comprising:
determining whether a number of program/erase (P/E) cycles experienced by the first block since being configured in multi-bit-per-cell mode is in a predetermined range;
in response to determining that the number of P/E cycles experienced by the first block since being configured in multi-bit-per-cell mode is not in the predetermined range, placing the first block in the RTU queue which corresponds to the health grade of the first block; and
in response to determining that the number of P/E cycles experienced by the first block since being configured in multi-bit-per-cell mode is in the predetermined range, transferring the first block to the first pool.

5. The computer-implemented method of claim 4, wherein transferring the first block to the first pool includes:
selecting two or more of the blocks configured in SLC mode in the first pool;
placing the first block in an RTU queue that is associated with the first pool; and
placing the two or more blocks configured in SLC mode in one of the RTU queues that are associated with the second pool.

6. The computer-implemented method of claim 4, wherein transferring the first block to the first pool includes:
reconfiguring the first block from multi-bit-per-cell mode to SLC mode;
placing the reconfigured first block in an RTU queue that is associated with the first pool;
reconfiguring a second block in the first pool from SLC mode to multi-bit-per-cell mode; and
placing the reconfigured second block in one of the RTU queues that are associated with the second pool.

7. The computer-implemented method of claim 3, comprising:
determining whether a number of program/erase (P/E) cycles experienced by the first block since being configured in SLC mode is in a second predetermined range;
in response to determining that the number of P/E cycles experienced by the first block since being configured in SLC mode is not in the second predetermined range, placing the first block in an RTU queue that is associated with the first pool; and
in response to determining that the number of P/E cycles experienced by the first block since being configured in SLC mode is in the second predetermined range, transferring the first block to the second pool.

8. The computer-implemented method of claim 1, comprising:
identifying a block having a health that is outside a predetermined range; and
permanently transferring the identified block to the first pool.

9. The computer-implemented method of claim 1, wherein the blocks configured in multi-bit-per-cell mode are configured in a multi-bit-per-cell mode selected from the group consisting of: triple-level cell (TLC) mode, quad-level cell (QLC) mode, and penta-level cell (PLC) mode.

10. A computer program product for wear leveling blocks of memory, the computer program product comprising a computer readable storage medium having program instructions embodied therewith, the program instructions readable and/or executable by a processor to cause the processor to:
determine, by the processor, a health of blocks of memory which are configured in multi-bit-per-cell mode, wherein the blocks configured in multi-bit-per-cell mode are in a second pool, wherein blocks configured in single-level cell (SLC) mode are in a first pool, with a proviso that the health of a block of memory is not determined while the block is configured in SLC mode;
assign, by the processor, health values to the blocks of memory in the second pool based on the health of the respective block;
correlate, by the processor, each of the health values with a respective data temperature;
perform, by the processor, garbage collection on a first block in the second pool; and
place, by the processor, the first block in a ready-to-use (RTU) queue which corresponds to a health grade of the first block and which is associated with the second pool,
wherein the second pool has more than one RTU queue associated therewith,
wherein each of the RTU queues corresponds to a different health grade of the blocks in the second pool.

11. The computer program product of claim 10, wherein the program instructions are readable and/or executable by the processor to cause the processor to:
receive, by the processor, a write request having data;
determine, by the processor, the temperature of the data in the write request;
select, by the processor, a block from one of the RTU queues associated with the second pool, wherein the one of the RTU queues corresponds to a health grade that is correlated with the temperature of the data in the write request, wherein the health grade is derived from the health value; and
use, by the processor, the selected block to satisfy the write request.

12. The computer program product of claim 10, wherein the program instructions are readable and/or executable by the processor to cause the processor to:
determine, by the processor, whether a number of program/erase (P/E) cycles experienced by the first block since being configured in multi-bit-per-cell mode is in a predetermined range;
in response to determining that the number of P/E cycles experienced by the first block since being configured in multi-bit-per-cell mode is not in the predetermined range, place, by the processor, the first block in the RTU queue which corresponds to the health grade of the first block; and
in response to determining that the number of P/E cycles experienced by the first block since being configured in multi-bit-per-cell mode is in the predetermined range, transfer, by the processor, the first block to the first pool.

13. The computer program product of claim 12, wherein transferring the first block to the first pool includes:
   selecting two or more of the blocks configured in SLC mode in the first pool;
   placing the first block in an RTU queue that is associated with the first pool; and
   placing the two or more blocks configured in SLC mode in one of the RTU queues that are associated with the second pool.

14. The computer program product of claim 12, wherein transferring the first block to the first pool includes:
   reconfiguring the first block from multi-bit-per-cell mode to SLC mode;
   placing the reconfigured first block in an RTU queue that is associated with the first pool;
   reconfiguring a second block in the first pool from SLC mode to multi-bit-per-cell mode; and
   placing the reconfigured second block in one of the RTU queues that are associated with the second pool.

15. The computer program product of claim 10, wherein the program instructions are readable and/or executable by the processor to cause the processor to:
   determine, by the processor, whether a number of program/erase (P/E) cycles experienced by the first block since being configured in SLC mode is in a second predetermined range;
   in response to determining that the number of P/E cycles experienced by the first block since being configured in SLC mode is not in the second predetermined range, place, by the processor, the first block in an RTU queue that is associated with the first pool; and
   in response to determining that the number of P/E cycles experienced by the first block since being configured in SLC mode is in the second predetermined range, transfer, by the processor, the first block to the second pool.

16. The computer program product of claim 10, wherein the program instructions are readable and/or executable by the processor to cause the processor to:
   identify, by the processor, a block having a health that is outside a predetermined range; and
   permanently transfer, by the processor, the identified block to the first pool.

17. The computer program product of claim 10, wherein the blocks configured in multi-bit-per-cell mode are configured in a multi-bit-per-cell mode selected from the group consisting of: triple-level cell (TLC) mode, quad-level cell (QLC) mode, and penta-level cell (PLC) mode.

18. A system, comprising:
   a plurality of non-volatile random access memory (NVRAM) blocks configured to store data;
   a processor; and logic integrated with and/or executable by the processor, the logic being configured to:
   determine, by the processor, a health of blocks of memory which are configured in multi-bit-per-cell mode, wherein the blocks configured in multi-bit-per-cell mode are in a second pool, wherein blocks configured in single-level cell (SLC) mode are in a first pool, with a proviso that the health of a block of memory is not determined while the block is configured in SLC mode, wherein the second pool has more than one ready-to-use (RTU) queue associated therewith, wherein each of the RTU queues corresponds to a different one of the health grades of the blocks in the second pool;
   assign, by the processor, health values to the blocks of memory in the second pool based on the health of the respective block; and
   correlate, by the processor, each of the health values with a respective data temperature; select, by the processor, a block from one of the RTU queues associated with the second pool, wherein the one of the RTU queues corresponds to a health grade that is correlated with a temperature of data in a received write request, wherein the health grade is derived from the health value; and
   use, by the processor, the selected block to satisfy the received write request.

19. The system of claim 18, the logic being configured to:
   determine, by the processor, the temperature of the data in the write request, wherein each of the RTU queues corresponds to a different health grade.

* * * * *